United States Patent
Gupta et al.

(10) Patent No.: US 11,482,027 B2
(45) Date of Patent: Oct. 25, 2022

(54) AUTOMATED EXTRACTION OF PERFORMANCE SEGMENTS AND METADATA VALUES ASSOCIATED WITH THE PERFORMANCE SEGMENTS FROM CONTRACT DOCUMENTS

(71) Applicant: SIRIONLABS PTE. LTD., Singapore (SG)

(72) Inventors: Aditya Gupta, Gurugram (IN); Yogesh Sharma, Rohtak (IN)

(73) Assignee: SIRIONLABS PTE. LTD., Singapore (SG)

( * ) Notice: Subject to any disclaimer, the term of this patent is extended or adjusted under 35 U.S.C. 154(b) by 258 days.

(21) Appl. No.: 16/741,547

(22) Filed: Jan. 13, 2020

(65) Prior Publication Data
US 2020/0226365 A1   Jul. 16, 2020

(30) Foreign Application Priority Data
Jan. 11, 2019   (IN) .............................. 201911001460

(51) Int. Cl.
*G06V 30/413*   (2022.01)
*G06N 20/00*   (2019.01)
*G06Q 50/18*   (2012.01)

(52) U.S. Cl.
CPC .......... *G06V 30/413* (2022.01); *G06N 20/00* (2019.01); *G06Q 50/18* (2013.01)

(58) Field of Classification Search
None
See application file for complete search history.

(56) References Cited

U.S. PATENT DOCUMENTS

| | | | |
|---|---|---|---|
| 2005/0182736 A1* | 8/2005 | Castellanos | G06F 40/211 705/80 |
| 2008/0010293 A1 | 1/2008 | Zpevak et al. | |
| 2014/0223284 A1 | 8/2014 | Rankin, Jr. et al. | |
| 2015/0278745 A1 | 10/2015 | Sharma et al. | |
| 2016/0364608 A1* | 12/2016 | Sengupta | G06F 40/258 |
| 2017/0098192 A1 | 4/2017 | Follis | |
| 2018/0268506 A1 | 9/2018 | Wodetzki et al. | |
| 2018/0315141 A1 | 11/2018 | Hunn et al. | |
| 2019/0005198 A1 | 1/2019 | Richards et al. | |

(Continued)

OTHER PUBLICATIONS

"Unlock the full value of documents and unstructured data," iManage RAVN Extract, retrieved from: https://imanage.com/wp-content/uploads/2018/07/iManage-Extract-Datasheet-Jul2018-Web_vF.pdf, copyright 2018, 4 pages.

(Continued)

*Primary Examiner* — Dov Popovici
(74) *Attorney, Agent, or Firm* — Klarquist Sparkman, LLP (57) ABSTRACT

A data processing system for extracting metadata values is described. The data processing system includes an input unit and a processor communicably coupled to the input unit. The input unit is configured to receive a contract document. The processor is configured to extract at least one segment from the contract document and identify a type of the at least one segment. The processor is further configured to extract at least one metadata value from the at least one segment based on a model, wherein the model is determined based on the identified type of the at least one segment.

13 Claims, 5 Drawing Sheets

(56) References Cited

U.S. PATENT DOCUMENTS

2019/0171950 A1    6/2019  Kumar

OTHER PUBLICATIONS

Bommarito et al., "LexNLP: Natural language processing and information extraction for legal and regulatory texts," retrieved from: https://www.groundai.com/project/lexnlp-natural-language-processing-and-information-extraction-for-legal-and-regulatory-texts/, Jun. 10, 2018, 11 pages.
Examination Report No. 1 received in related Australia Application No. 2020200231, dated Nov. 18, 2020, 6 pages.
European Search Report received in related European Application No. EP 20 151 381.9, dated Feb. 12, 2020, 15 pages.

* cited by examiner

| METADATA | SERVICE NAME | FREQUENCY OF SERVICE | RESPONSIBLE PARTY | . . . . |
|---|---|---|---|---|

*FIG. 3*

| METADATA | EXTRACTION MACHINE LEARNING MODEL | ACCURACY | TYPE OF PERFORMANCE SEGMENT | LOCATION |
|---|---|---|---|---|
| SERVICE NAME | NER | 90% | SERVICE LEVEL AGREEMENT | /D/12 |
| FREQUENCY OF SERVICE | NER | 89% | OBLIGATION | /D/14 |
| RESPONSIBLE PARTY | Ngram | 80% | SERVICE LEVEL AGREEMENT, OBLIGATION | /D/126 |
| OWNERSHIP | Syntatic-Rule | 88% | SERVICE LEVEL AGREEMENT | /D/11 |
| OWNERSHIP | Multinomial-nb | 80% | OBLIGATION | /D/16 |
| ..... | ..... | ..... | ..... | ..... |

AUTOMATED EXTRACTION OF PERFORMANCE SEGMENTS AND METADATA VALUES ASSOCIATED WITH THE PERFORMANCE SEGMENTS FROM CONTRACT DOCUMENTS

TECHNICAL FIELD

The present disclosure relates to methods and systems for automated extraction of performance segments and metadata values associated with the performance segments from a contract document. More particularly, the present disclosure relates to methods and systems for automated extraction of performance segments and metadata values associated with the performance segments from a contract document based on types of the performance segments.

BACKGROUND

A contract document is a legally enforceable agreement between contracting parties to exchange values such as goods, services, or property. The contract document specifies contract obligations and service level agreements that each contracting party is legally obliged to meet. The failure to fulfil any such contract obligations or service level agreements is considered as a 'breach' and may result in financial loss and other legal implications. However, constant tracking of the obligations or service level agreements included in the contract document is a laborious and a time consuming task. Moreover, the modern business organizations have a huge number of contract documents and it may be difficult to extract relevant information from such contract documents.

SUMMARY OF THE INVENTION

This summary is provided to introduce concepts related to the present inventive subject matter. The summary is not intended to identify essential features of the claimed subject matter nor is it intended for use in determining or limiting the scope of the claimed subject matter. The embodiments described below are not intended to be exhaustive or to limit the disclosure to the precise forms disclosed in the following detailed description. Rather, the embodiments are chosen and described so that others skilled in the art may appreciate and understand the principles and practices of the present inventive subject matter.

In one aspect, the disclosure is directed towards a data processing system comprising an input unit and a processor communicably coupled to the input unit. The input unit is configured to receive a contract document. The processor is configured to extract at least one segment from the contract document and identify a type of the at least one segment. The processor is further configured to extract at least one metadata value from the at least one segment based on a model, wherein the model is determined based on the identified type of the at least one segment.

In another aspect, the disclosure is directed towards a method for extraction of a metadata value from the contract document. The method includes extracting, by a processor, at least one segment from the contract document and identifying, by the processor, a type of the at least one segment. The method further includes extracting, by the processor, at least one metadata value from the at least one performance segment based on a model, wherein the model is determined based on the identified type of the at least one segment.

Numerous advantages and benefits of the inventive subject matter disclosed herein will become apparent to those of ordinary skill in the art upon reading and understanding the present specification. It is to be understood, however, that the detailed description of the various embodiments and specific examples, while indicating preferred and/or other embodiments, are given by way of illustration and not limitation. Many changes and modifications within the scope of the present disclosure may be made without departing from the spirit thereof, and the disclosure includes all such modifications.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed disclosure and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

The method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Hereinafter, the preferred embodiments of the present disclosure will be described in conjunction with the accompanying drawings, it should be understood that the preferred embodiments described herein are only used to illustrate and explain the present disclosure and are not intended to limit the present disclosure.

References to "some embodiment", "an embodiment", "at least one embodiment", "one example", "an example", "for example" and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in some embodiment" does not necessarily refer to the same embodiment.

Figure 1:
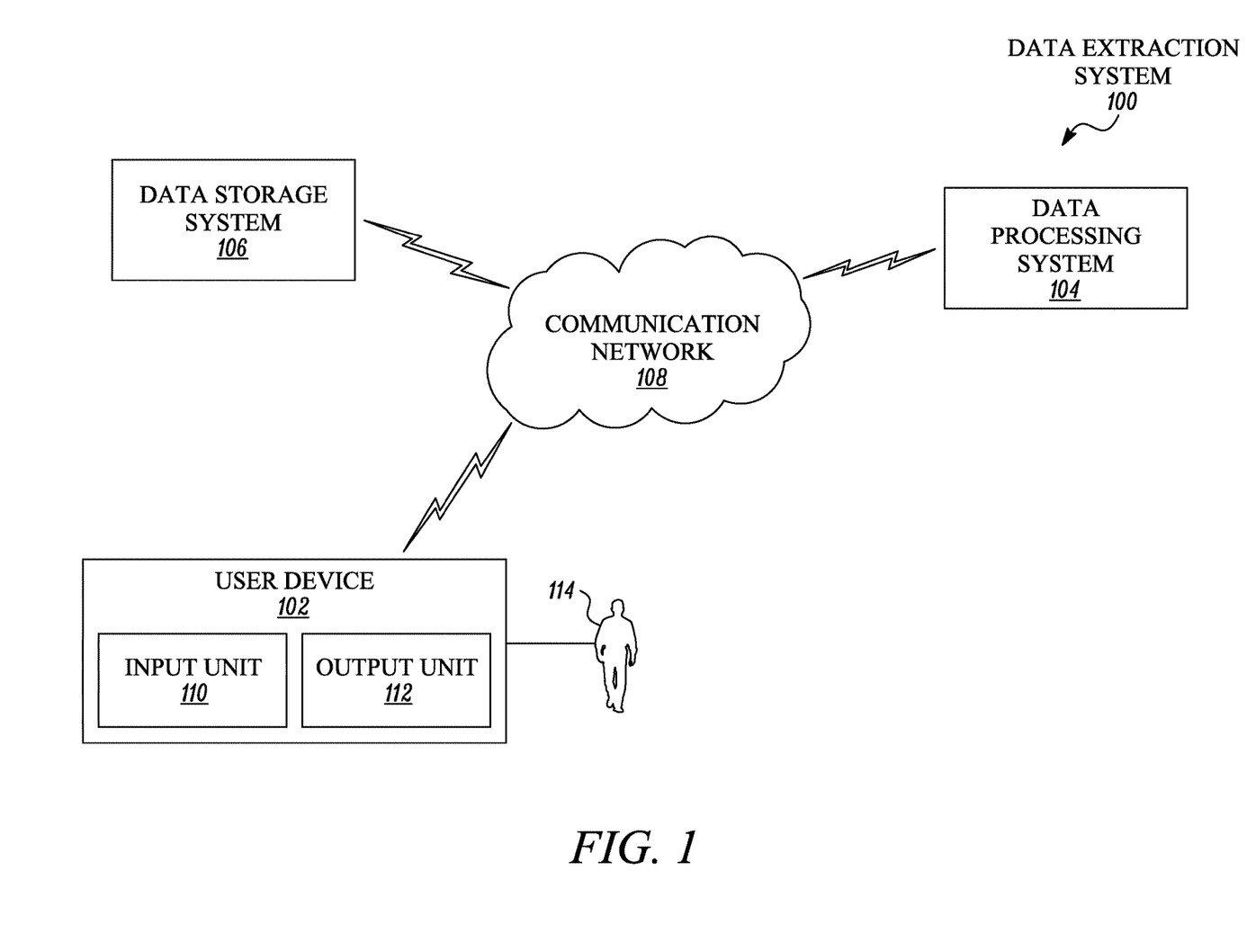
FIG. 1 illustrates a block diagram of an exemplary data extraction system, in accordance with the embodiments of the present disclosure.

The present disclosure relates to a system and a method for extraction of performance segments and metadata values associated with the performance segments from a contract document. FIG. 1 illustrates a block diagram of an exemplary data extraction system 100 for extraction of performance segments and metadata values associated with the performance segments of a contract document, in accordance with the embodiments of the present disclosure. The contract document may be a hand-written and/or an electronic document drafted on a counterparty paper or any other standard/non-standard paper. The contract document may include a plurality of performance segments (herein referred interchangeably as segments). A performance segment of the contract document is a part of a contract that conveys a business meaning about a subject in the contract document. In an exemplary embodiment, the performance segment may comprise of one or more clauses, paragraphs, or tables or a combination thereof. A metadata values, extracted by the data extraction system 100, may be defined as value of metadata associated with a performance segment. In an example, the metadata associated with a performance segment may be a 'responsible party' etc., and the metadata value associated with the metadata may be a 'supplier'.

The data extraction system 100 depicted in FIG. 1 may be implemented in any suitable computing environment, such as one or more of, a desktop or a laptop computer, a computer server, or a mobile computing device, such as a mobile phone, a Personal Digital Assistant (PDA), or a smart phone. In addition, the data extraction system 100 may be combined into fewer systems than shown or divided into more systems than shown. The communications links depicted in FIG. 1 may be through wired or wireless connections and may be a part of a secured network, such as a local area network (LAN) and/or a combination of networks, such as LANs, WANs, MANs and/or the Internet.

The data extraction system 100 may include a user device 102, a data processing system 104, and a data storage system 106, all operatively connected to communicate with each other via a suitable communication network 108. The user device 102 may be configured to receive a contract document from a user 114 and transmit it to the data processing system 104. Although not described, a person with ordinary skill in the art would appreciate that the user device 102 may be configured to receive a plurality of contract documents from a plurality of users and transmit the plurality of contract documents to the data processing system 104.

For the sake of clarity, the forthcoming disclosure includes discussions with respect to extraction of a performance segment and a metadata value associated with the performance segment. However, the discussions may be applied for extraction of multiple performance segment and/or multiple metadata values associated with each performance segment.

The user device 102 may be further configured to receive a performance segment and a metadata value associated with the performance segment from the data processing system 104. The user device 102 may further be configured to display the performance segment and the metadata value to the user on the user device 102. The user device 102 may be, for example, one or more types of communication device such as a mobile phone, smart phone, mobile node, personal digital assistant, tablet computer, laptop computer, or the like with communication capabilities configured to receive the contract document. The user device 102 may include an input unit 110 and an output unit 112. The input unit 110 may be a keypad, a touchpad, a scanner, a camera or any other input device configured to receive the contract document or other inputs from the user. The output unit 112 may be a display device or a display screen or any other output device configured to display the contract document, the performance segment, and the metadata value associated with the performance segment.

The data processing system 104 may be configured to receive the contract document and extract the performance segment and the metadata value associated with the performance segment from the contract document. The detailed functionalities of the data processing system 104 are described in the following sections in connection with FIG. 2. The data processing system 104 may be a centralized system (which may be implemented on a server or a cloud server, etc.) connected to the various other components of the data extraction system 100 via the communication network 108. The data processing system 104 may include suitable logic, circuitry, and/or interfaces that are configured to control the various operations of the data processing system 104.

The data storage system 106 may be configured to store a plurality of standard performance segments and corresponding types of each of the plurality of standard performance segments. The plurality of the standard performance segments and the corresponding types of the standard performance segments may be referred to a training set in the forthcoming disclosure. The training set may be utilized by the processor 208 to build one or more machine learning models, using one or more machine learning algorithms, for determining a type of the performance segment in the contract document. In accordance with various embodiments, the data storage system 106 may be implemented with a semiconductor memory for example, RAM, ROM, Flash, a hard disk, or some other data storage technology that can provide fast access to the data stored thereon.

Figure 2:
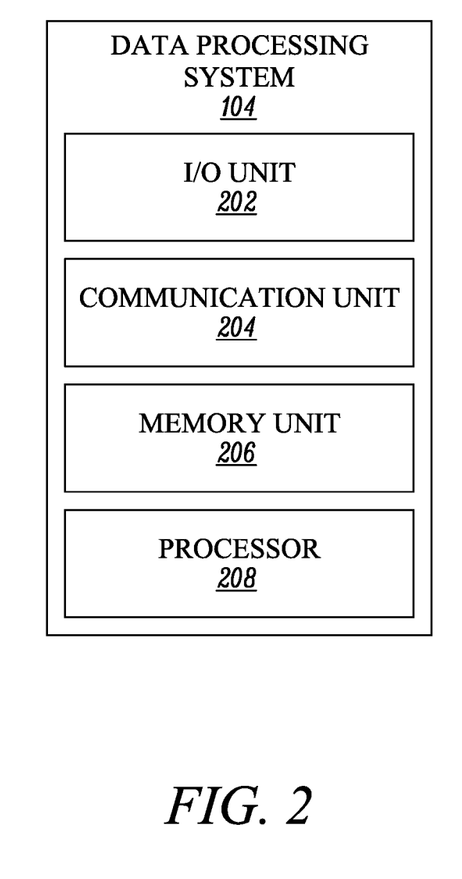
FIG. 2 illustrates a block diagram of a data processing system of the data extraction system of FIG. 1, in accordance with the embodiments of the present disclosure.

FIG. 2 illustrates a block diagram of the data processing system 104 of the data extraction system 100, in accordance with various embodiments of the present disclosure. The data processing system 104 may include an Input/Output unit 202 (hereinafter referred interchangeably as I/O unit 202, Input unit 202, and Output unit 202), a communication unit 204, a memory unit 206, and a processor 208. The I/O unit 202 may be configured to communicate with the user device 102 and the data storage system 106 via the communication unit 204. In an embodiment, the I/O unit 202 may be configured to receive the contract document from the user device 102 via the communication unit 204. The I/O unit 202 may be further configured to communicate with the user device 102 via the communication unit 204, to transmit the performance segment and the metadata value associated with the performance segment of the contract document. The communication unit 204 may be configured to enable the data processing system 104 to connect to the various components of the data extraction system 100. The communication unit 204 may include a modem, an ethernet card, or other similar devices.

Figure 3:
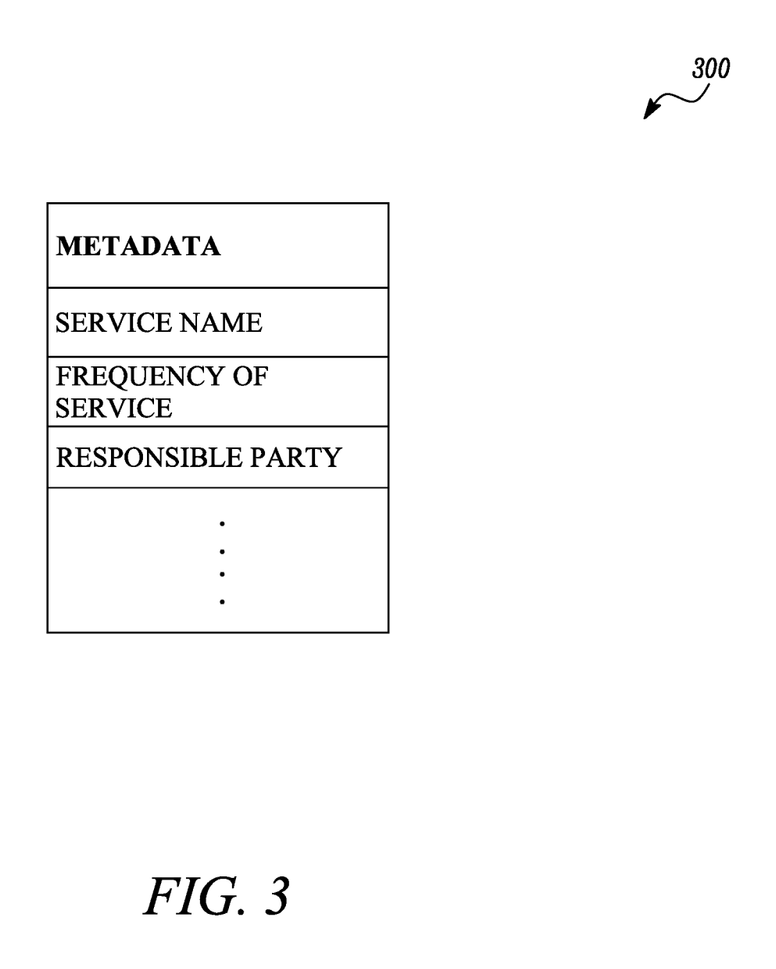
FIG. 3 illustrates an exemplary list of metadata associated with a type of performance segment, in accordance with the embodiments of the present disclosure.

The memory unit 206 may be configured to store a set of instructions that are executable by the processor 208 to perform predetermined operations. The memory unit 206 may be further configured to store the one or more machine learning models for identifying a type of the performance segment in the contract document. The memory unit 206 may further include a table (not shown) that includes a list of metadata associated with various types of performance segments. In an embodiment, the table may include a separate list of metadata for each type of performance segment. An example shown in FIG. 3 illustrates a list 300 of metadata associated with an obligation type of performance segment. As shown in FIG. 3, the obligation type of performance segment may include metadata such as service name, responsibility etc.

Figure 4:
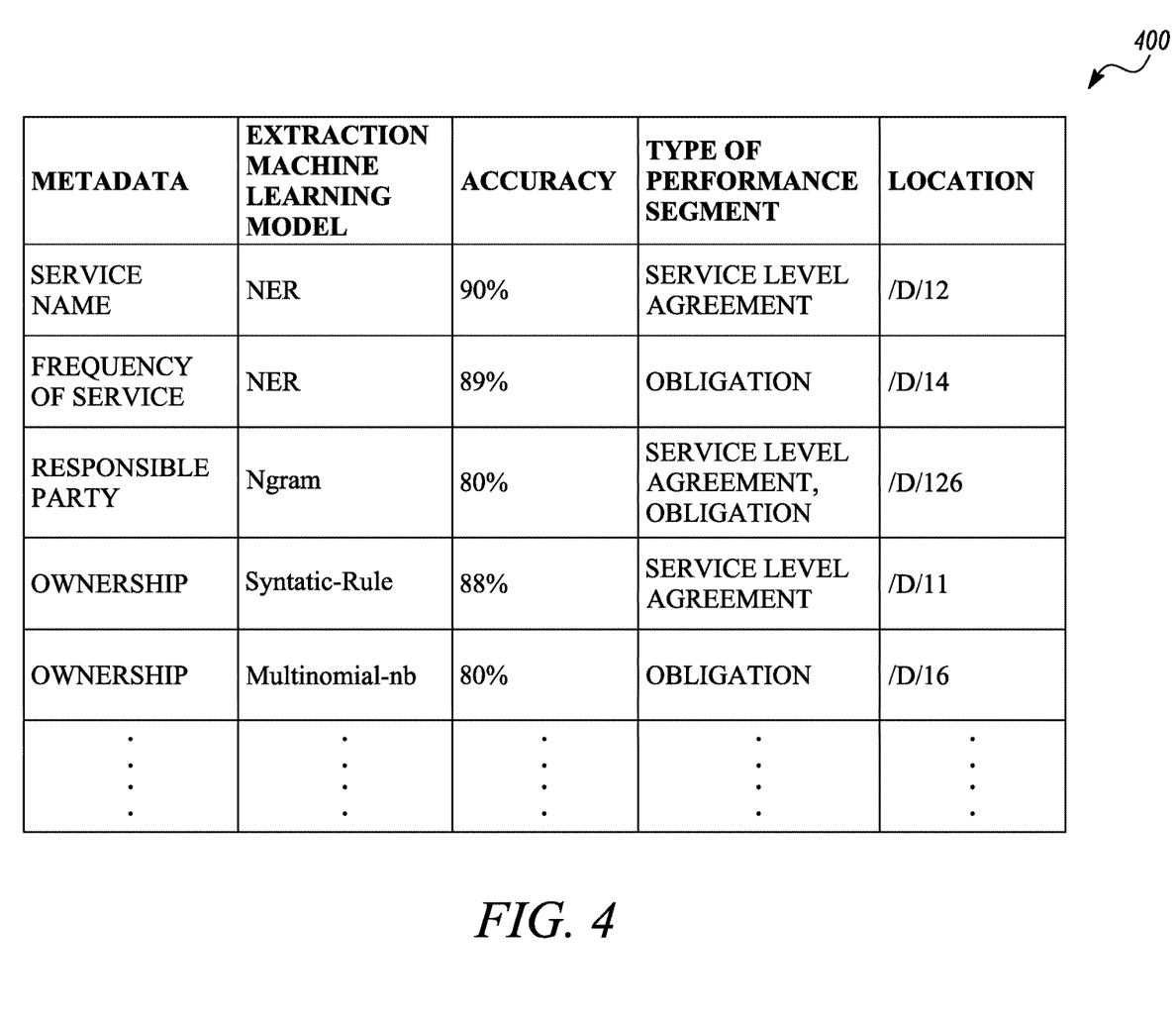
FIG. 4 illustrates an exemplary table including reference to various metadata, extraction machine learning models associated with each metadata, accuracy associated with each extraction machine learning model, an applicable type of performance segment, and location of each extraction machine learning model in a memory unit 206 of the data processing system of FIG. 2, in accordance with the embodiments of the present disclosure.

The memory unit 206 may be further configured to store a table 400 (as shown in FIG. 4) that includes reference to various metadata, extraction machine learning model associated with each metadata, accuracy associated with each extraction machine learning model, an applicable type of performance segment, and location of each extraction machine learning model. The table 400 may list various metadata corresponding to which the metadata values may be extracted using the associated extraction machine learning models. The extraction machine learning models may be further listed in table 400. Few examples of the extraction machine learning models may include Named-entity recognition (NER), N-gram language model, syntactic rule, Multinomial-nb etc. These extraction machine learning models are well-known in the art and are not described in greater detail for the sake of brevity of the disclosure. The table 400 may further define the accuracy of each extraction machine learning model. In an embodiment, the accuracy of each extraction machine learning model may be determined by executing the extraction machine learning models on a sample data set. The table 400 may further list the applicable type of performance segments for which the corresponding extraction machine learning model may be used. The table 400 may further define the location of the corresponding extraction machine learning model in the memory unit 206.

In accordance with various embodiments of the present disclosure, the table 400 may be referred by the processor 208 to identify the extraction machine learning model for extracting metadata values. The identified extraction machine learning model may depend on the associated metadata and the associated type of the performance segment as shown in the table 400. In the example shown in the table 400, the processor 208 may determine that the 'NER' extraction algorithm may be used to extract metadata values corresponding to 'service name' metadata when the type of performance segment is 'service level agreement'.

The memory unit 206 may be further configured to store one or more extraction algorithms listed in table 400 (may be hereinafter referred to as extraction machine learning models) for extracting metadata values. The memory unit 206 may be configured to store a list of key terms associated with various types of performance segments. The stored list of key terms may be used by the processor 208 to validate the type of the performance segment identified by the one or more machine learning models.

The memory unit 206 may include any data storage medium known in the art including, for example, an IC (integrated circuit) memory chip containing any form of volatile memory like RAM (random-access memory) or non-volatile memory like ROM (read-only memory), a floppy disk, a CD-ROM (compact disk read-only memory), a hard disk drive, a DVD (digital video disc), a flash memory, external subscriber identity module (SIM) card or any other medium for storing non-transitory digital information.

The processor 208 may be configured to extract a metadata value associated with a performance segment. In an embodiment of the present disclosure, the contract document received from the user device 102 via the I/O unit 202 may be processed by the processor 208. The processor 208 may be configured to parse the received contract document into a plurality of performance segments. The processor 208 may be configured to parse the contract document into the plurality of performance segments using probabilistic match score algorithm or any other techniques well-known in the art. The processor 208 may be further configured to extract the performance segment from the plurality of performance segments in the contract document. In an embodiment, the processor 208 may also be configured to digitize the contract document, using Optical Character Recognition (OCR) technique or other text recognition techniques. Various machine learning models and third-party libraries may also be used to convert tables and multi-columnar formats in the contract document into a common electronic format.

The processor 208 may be further configured to determine a type of the extracted performance segment. In an embodiment, the processor 208 may be configured to execute the one or more machine learning models to identify a relevant standard performance segment, from the plurality of standard performance segments. The relevant standard performance segment may be identified based on a probabilistic match score algorithm or any machine learning based statistical classification of a text of the performance segment. The probabilistic match score algorithm or the machine learning based statistical classification are well-known in the art and are not described in detail for the sake of brevity. The processor 208, upon determining the relevant performance segment, may be configured to determine the corresponding type (defined in the memory unit 206) of the relevant standard performance segment as the type of the extracted performance segment.

In some embodiments, the processor 208 may be further configured to validate an output of the one or more machine learning models using a rule-based engine (not shown). The rule-based engine may be implemented as a part of the processor 208 or as a separate component in the data processing system 104. The rule-based engine may be configured to validate the output (i.e. the type of performance segment) of the one or more machine learning models based on the list of key terms associated with various types of performance segments stored in the memory unit 206. In an example, the rule-based engine may be configured to validate whether the type of performance segment identified based on the one or more machine learning model is correct or not. The rule-based engine may be configured to perform such validation by comparing key terms listed in the performance segment with the list of key terms corresponding to the various types of the performance segments stored in the memory unit 206. The rule-based engine may be configured to further identify the type of the performance segment based on the match. In an example, the rule-based engine may be further configured to control the display the performance segment to the user on the user device 102 and request the type of the performance segment, when the types identified by the one or more machine learning models and the rule-based engine are different.

The processor 208 may be further configured to identify a metadata associated with the identified type of the performance segment. In an embodiment, the processor 208 may be configured to identify the metadata associated with the identified type of performance segment by extracting the stored list of metadata corresponding to the identified type of performance segment from the memory unit 206. As discussed above, the memory unit 206 stores a list of metadata associated with various types of performance segments. The processor 208 may be further configured to extract metadata value, associated with the identified metadata, from the performance segment. In an embodiment, the processor 208 may be configured to execute the extraction machine learning model, corresponding to the metadata and the type of performance segment, to extract the metadata value. In an embodiment, the processor 208 may be further configured to refer the table 400 as described in FIG. 4 to identify the extraction algorithm machine learning model corresponding to the metadata and the type of performance segment. The extraction algorithm for extracting the metadata values depends on a combination of the metadata (corresponding to which the metadata values are to be extracted) and the type of the performance segment (from which the metadata values are to be extracted).

In an embodiment of the present disclosure, the processor 208 may be configured to transmit the extracted performance segment and the metadata value associated with the performance segment to the user device 102 via the communication network 108 for display. The metadata values associated with the one or more performance segments may be further utilized by the processor 208 to generate performance reports. The performance report may be transmitted to the user device 102 via the communication network 108.

The processor 208 of the data processing system 104 may include, but not limited to, one or more central processing units (CPUs), microprocessors, microcomputers, microcontrollers, digital signal processors (DSPs), state machines, logic circuitries, or any hardware devices that manipulate commands or signals based on operational instructions. Such operational or programming instructions are stored in the memory unit 206. Among other capabilities, the processor 208 fetches and executes computer-readable instructions stored in the memory unit 206. One of ordinary skill in the art will recognize that the processor 208 has one or more of its functions performed by a state machine or logic circuitry, and the memory unit 206 containing the corresponding operational instructions can be embedded within the state machine or logic circuitry.

Figure 5:
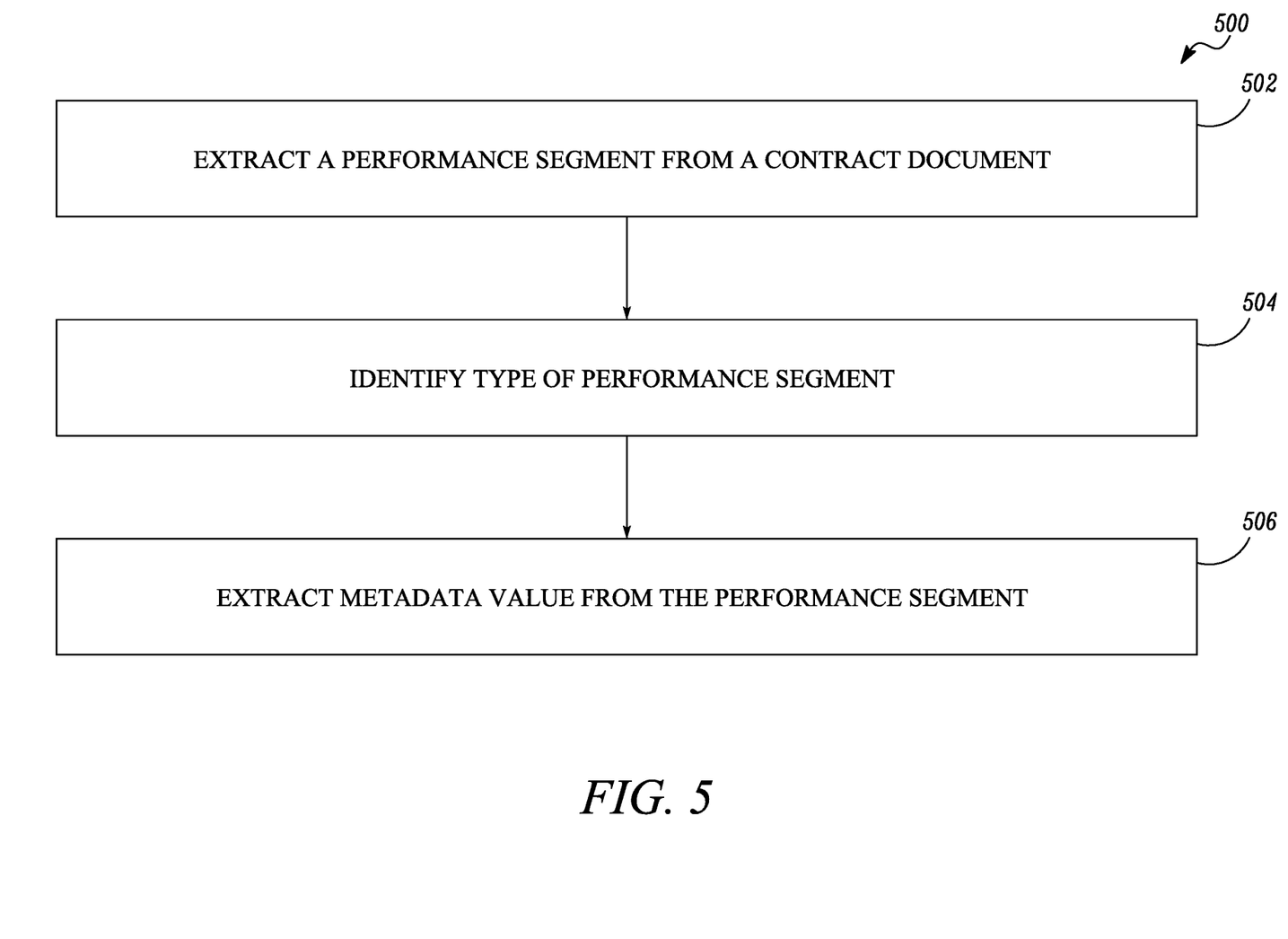
FIG. 5 illustrates an exemplary method for extraction of performance segments and metadata values associated with the performance segments from a contract document in the data extraction system of FIG. 1, in accordance with the embodiments of the present disclosure.

FIG. 5 illustrates an exemplary flow diagram illustrating a method 500 for extraction of a performance segment and a metadata value from the performance segment of the contract document, in accordance with various embodiments of the present disclosure. For the sake of clarity, the forthcoming disclosure includes discussions with respect to extraction of a performance segment and a metadata value associated with the performance segment. However, the discussions may be applied for extraction of multiple performance segment and/or multiple metadata values associated with each performance segment.

At step 502, the processor 208 extracts a performance segment from a contract document. In an embodiment, the contract document is first parsed by the processor 208 into the plurality of performance segments using probabilistic match score algorithm or any other techniques well-known in the art. The processor 208, upon parsing the document, extracts the performance segment from the contract document.

At step 504, the processor 208 determines a type of the extracted performance segment. In an embodiment, the processor 208 executes the one or more machine learning models to identify a relevant standard performance segment, from the plurality of standard performance segments. The relevant standard performance segment is identified based on the probabilistic match score algorithm or any machine learning based statistical classification of a text of the performance segment. The processor 208, upon determining the relevant performance segment, determines the corresponding type (defined in the memory unit 206) of the relevant standard performance segment as the type of the extracted performance segment. In an exemplary embodiment, the processor 208 determines that the type of the performance segment is the obligation type.

In some embodiments, the processor 208 validates the output of the one or more machine learning models using the rule-based engine (not shown). The rule-based engine validates the output of the one or more machine learning models based on the list of key terms associated with the various types of performance segments stored in the memory unit 206. The rule-based engine performs such validation by comparing key terms listed in the performance segment with the list of key terms corresponding to the various types of the performance segments and identifying the type of the performance segment based on the match. In an embodiment, the rule-based engine controls the display the performance segment to the user on the user device 102 and requests the type of the performance segment, when the types identified by the one or more machine learning models and the rule-based engine are different.

The processor 208 further identifies the metadata associated with the identified type of the performance segment from the stored list of metadata associated with various types of performance segments in the memory unit 206. In the exemplary embodiment discussed above, the processor 208, at this stage, determines that the at least one metadata associated with the obligation type of performance segment is frequency from the list of metadata stored in the memory unit 206.

At step 406, the processor 208 extracts metadata value, associated with the identified metadata, from the performance segment. In an embodiment, the processor 208 determines the extraction machine learning model for extraction of the identified metadata value from the performance segment based on details provided in the table 400. As shown in the table 400, the extraction machine learning model for extraction of metadata values corresponding to a metadata depends on a combination of the metadata and the type or the performance segment associated with the metadata. In the exemplary embodiment discussed above, the processor 208, at this stage, identifies that the extraction machine learning model to be used for the extraction of metadata values is 'NER' when the metadata is frequency and the type of performance segment is obligation type based on the data provided in the table 400. The processor 208 then executes the identified extraction machine learning model to extract metadata values corresponding to the 'frequency' metadata from the obligation type of the performance segment.

The processor 208 further transmits the extracted performance segment and the metadata value associated with the performance segment to the user device 102 via the communication network 108 for display.

The data extraction system 100 of the present disclosure enables the accurate extraction of the desired metadata values from the contract document by extracting the metadata values from a corresponding relevant segments of the contract document. The data extraction system 100 of the present disclosure is directed towards identifying various performance segments in the contract document before extraction of the metadata values and extracting the metadata values from the relevant performance segments only.

This reduces the time required to extract the metadata values as the entire contract document need not to be processed and the required results can be obtained by processing the relevant segments only. This also further results in providing the accurate results as only the relevant sections are considered for the extraction. Moreover, the accuracy of the data extraction system 100 is further increased by utilizing a rule-based engine that validates the outputs of the one or more machine learning models used in the system.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, or article that comprises, has, includes, contains a list of elements does not include only those elements but may include other elements not expressly listed or inherent to such process, method, or article. An element proceeded by "comprises . . . a", "has . . . a", "includes . . . a", "contains . . . a" does not, without more constraints, preclude the existence of additional identical elements in the process, method, or article that comprises, has, includes, contains the element. The terms "a" and "an" are defined as one or more unless explicitly stated otherwise herein. A device or structure that is "configured" in a certain way is configured in at least that way but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

All or part of the system and its logic and data structures may be stored on, distributed across, or read from one or more types of computer readable storage media. Examples of the computer readable storage medium may include a hard disk, a floppy disk, a CD-ROM, a flash drive, a cache, volatile memory, non-volatile memory, RAM, flash memory, or any other type of computer readable storage medium or storage media. The computer readable storage medium may include any type of non-transitory computer readable medium, such as a CD-ROM, a volatile memory, a non-volatile memory, ROM, RAM, or any other suitable storage device.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A data processing system for processing a contract document having at least one performance segment, the data processing system comprising:
   an input unit configured to receive the contract document from a user device;
   a memory unit configured to store a plurality of extraction machine learning models; and
   a processor communicably coupled to the input unit and the memory unit, the processor being configured to:
   extract the at least one performance segment from the contract document;
   execute one or more machine learning models that output a type of performance segment associated with the extracted at least one performance segment based on input of the extracted at least one performance segment, wherein the one or more machine learning models are trained with a training set comprising a plurality of predefined standard performance segments and corresponding types of each of the plurality of predefined standard performance segments, and the one or more machine learning models identify the type of performance segment;
   identify at least one metadata associated with the identified type of performance segment, the at least one metadata being selected from a predefined list of metadata associated with a plurality of types of performance segments;
   based on the identified type of performance segment associated with the at least one performance segment and the identified at least one metadata associated with the identified type of performance segment, select at least one extraction machine learning model from the plurality of extraction machine learning models; and extract at least one metadata value, associated with the identified at least one metadata, from the at least one performance segment with the at least one extraction machine learning model selected from the plurality of extraction machine learning models.

2. The data processing system as claimed in claim 1, wherein the processor is further configured to validate the identified type of the at least one performance segment using a machine learning engine based on a list of key terms associated with the plurality of types of performance segments.

3. The data processing system as claimed in claim 1, wherein the processor is further configured to:
parse the contract document into a plurality of performance segments prior to the extraction of the at least one performance segment from the contract document.

4. The data processing system as claimed in claim 1, wherein the memory unit is configured to store a table including reference to a plurality of predefined metadata, a plurality of extraction machine learning models associated with each of the predefined metadata, an accuracy associated with each of the plurality of extraction machine learning models, and a corresponding type of performance segment.

5. The data processing system as claimed in claim 1, wherein the processor is configured to transmit the extracted at least one performance segment and the at least one metadata value associated with the extracted at least one performance segment to the user device for display.

6. The data processing system as claimed in claim 4, wherein the processor is further configured to select the at least one extraction machine learning model based on the table stored in the memory unit.

7. A method for processing a contract document having at least one performance segment, the method comprising:
extracting, by a processor, at least one performance segment from the contract document;
executing, by the processor, one or more machine learning models that output a type of performance segment associated with the extracted at least one performance segment based on an input of the extracted at least one performance segment, wherein the one or more machine learning models are trained with a training set comprising a plurality of predefined standard performance segments and corresponding types of each of the plurality of predefined standard performance segments, and the one or more machine learning models identify the type of performance segment;
identifying, by the processor, at least one metadata associated with the identified type of performance segment, the at least one metadata being selected from a predefined list of metadata associated with a plurality of types of performance segments;
based on the identified type of performance segment associated with the at least one performance segment and the identified at least one metadata associated with the identified type of performance segment, selecting at least one extraction machine learning model from a plurality of extraction machine learning models; and
extracting, by the processor, at least one metadata value, associated with the identified at least one metadata, from the at least one performance segment with the at least one extraction machine learning model selected from the plurality of extraction machine learning models.

8. The method as claimed in claim 7, further comprising:
validating, by the processor, the identified type of the at least one performance segment using a rule-based engine based on a list of key terms associated with the plurality of types of performance segments.

9. The method as claimed in claim 7, further comprising:
parsing, by the processor, the contract document into a plurality of performance segments prior to the extraction of the at least one performance segment from the contract document.

10. The method as claimed in claim 7, further comprising:
storing, in a memory unit, a table including reference to a plurality of predefined metadata, a plurality of extraction machine learning models associated with each of the predefined metadata, an accuracy associated with each of the plurality of extraction machine learning models, and a corresponding type of performance segment.

11. The method as claimed in claim 10, further comprising:
selecting, by the processor, the at least one extraction machine learning model based on the table stored in the memory unit.

12. The method as claimed in claim 7, further comprising:
transmitting, by the processor, the extracted at least one performance segment and the at least one metadata value associated with the extracted at least one performance segment to a user device for display.

13. One or more non-transitory computer-readable media having stored therein computer-executable instructions causing one or more processors, when programmed thereby, to perform operations processing a contract document having at least one performance segment, wherein the operations comprise:
extracting, by a processor, at least one performance segment from the contract document;
executing, by the processor, one or more machine learning models that output a type of performance segment associated with the extracted at least one performance segment based on input of the extracted at least one performance segment, wherein the one or more machine learning models are trained with a training set comprising a plurality of predefined standard performance segments and corresponding types of each of the plurality of predefined standard performance segments, and the one or more machine learning models identify the type of performance segment;
identifying, by the processor, at least one metadata associated with the identified type of performance segment, the at least one metadata being selected from a predefined list of metadata associated with a plurality of types of performance segments;
based on the identified type of performance segment associated with the at least one performance segment and the identified at least one metadata associated with the identified type of performance segment, selecting at least one extraction machine learning model from a plurality of extraction machine learning models; and
extracting, by the processor, at least one metadata value, associated with the identified at least one metadata, from the at least one performance segment with the at least one extraction machine learning model selected from the plurality of extraction machine learning models.

* * * * *